United States Patent
DeJohn

(10) Patent No.: US 6,949,907 B2
(45) Date of Patent: Sep. 27, 2005

(54) METHOD AND APPARATUS FOR EXTENDING THE TORQUE RANGE OF A STEPPER MOTOR

(75) Inventor: Charles R. DeJohn, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/645,757

(22) Filed: Aug. 21, 2003

(65) Prior Publication Data

US 2005/0040784 A1 Feb. 24, 2005

(51) Int. Cl.$^7$ .............................................. G05B 19/40
(52) U.S. Cl. ........................ 318/685; 318/432; 318/433
(58) Field of Search ................................. 318/685, 432, 318/433, 109, 98

(56) References Cited

U.S. PATENT DOCUMENTS

| | | | | |
|---|---|---|---|---|
| 3,731,564 A | * | 5/1973 | Diener et al. ................. | 82/148 |
| 5,996,553 A | * | 12/1999 | Sanvido et al. ........ | 123/339.23 |
| 6,062,063 A | | 5/2000 | Robson | |
| 6,267,559 B1 | * | 7/2001 | Mossman et al. .......... | 417/44.1 |
| 6,642,636 B2 | | 11/2003 | Enzinna | |
| 2003/0143445 A1 | * | 7/2003 | Daniel et al. .................. | 429/19 |

* cited by examiner

*Primary Examiner*—Karen Masih
(74) *Attorney, Agent, or Firm*—Paul L. Marshall

(57) ABSTRACT

An apparatus including a stepper motor for actuating a moveable element of the apparatus. The maximum torque that can be generated at each step is a function of the voltage supplied to the motor. In some applications, however, torque greater than the nominal maximum may be required for brief periods. Under such conditions, the need for greater torque is sensed and a controller supplies a higher voltage to the motor, thereby increasing temporarily the output torque. When increased torque is no longer required, the voltage is reduced to nominal. The invention is useful, for example, for extending the range of a stepper motor actuator for an intake air control valve in a fuel cell assembly.

15 Claims, 1 Drawing Sheet

METHOD AND APPARATUS FOR EXTENDING THE TORQUE RANGE OF A STEPPER MOTOR

TECHNICAL FIELD

The present invention relates to stepper motors; more particularly, to method and apparatus for controlling the action of stepper motors; and most particularly, to means for temporarily extending the torque range of a stepper motor.

BACKGROUND OF THE INVENTION

So-called "stepper" motors are widely used in applications wherein the position of a mechanical element must be readily and accurately adjusted over a predetermined range of possible positions. For example, in controlling a throttle valve, the position of a valve head with respect to a valve seat must be adjustable over a range of head positions, typically from fully open to fully closed. Stepper motors are well-suited to providing such valve control. They operate by switching the polarity of the voltage on the input motor windings. Without a feedback device, it is assumed that the motor armature moves incrementally a predetermined amount (a "step") for each change in voltage polarity.

A stepper motor can respond to a range of loads by providing a range of torque outputs at a fixed motor voltage, for example, 12 volts, for which the windings are sized. Thus, for each specific application of a stepper motor as an electromechanical actuator, the size of stepper motor selected is determined in large by the nominal operating load range to be encountered.

In some applications, however, the nominal range of operating loads may occasionally be exceeded. For example, in controlling the head position of an inlet air valve for a solid-oxide fuel cell assembly, high torque may be required when manifold pressures are high or when the valve head is nearly seated. Under such high load conditions, a stepper motor sized for the typical range of loads will overheat and lose efficiency.

A prior art approach to this problem is to provide a larger, greater-range stepper motor capable of handling both the normal range of loads and the occasional and brief extremes. However, increasing the size and range of the stepper motor increases the size and cost of the system, and may reduce control sensitivity by increasing the size of each step.

What is needed is a means for temporarily extending the torque capabilities of a stepper motor beyond its rated torque output range.

It is a principal object of the present invention to briefly and temporarily extend the torque output range of a stepper motor.

It is a further object of the invention to minimize the size of a stepper motor required for a particular range of loads.

SUMMARY OF THE INVENTION

Briefly described, an apparatus includes a stepper motor for actuating a portion of the apparatus in response to a control signal. The stepper motor is configured to move in incremental steps in response to polarity reversals of an input voltage. The maximum torque that can be generated at each step is a function of the voltage supplied to the motor. Thus, a motor is constructed and rated for operation at a nominal voltage, for example, 12 volts DC, to produce a nominal maximum torque. In some applications, however, such as controlling the position of an air inlet valve for a solid-oxide fuel cell (SOFC) assembly, torque greater than the nominal maximum may be required for brief periods. Under such conditions, the need for greater torque is sensed and a higher voltage is supplied temporarily to the motor, thereby increasing temporarily the output torque. When greater torque is no longer required, the voltage is reduced to nominal.

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
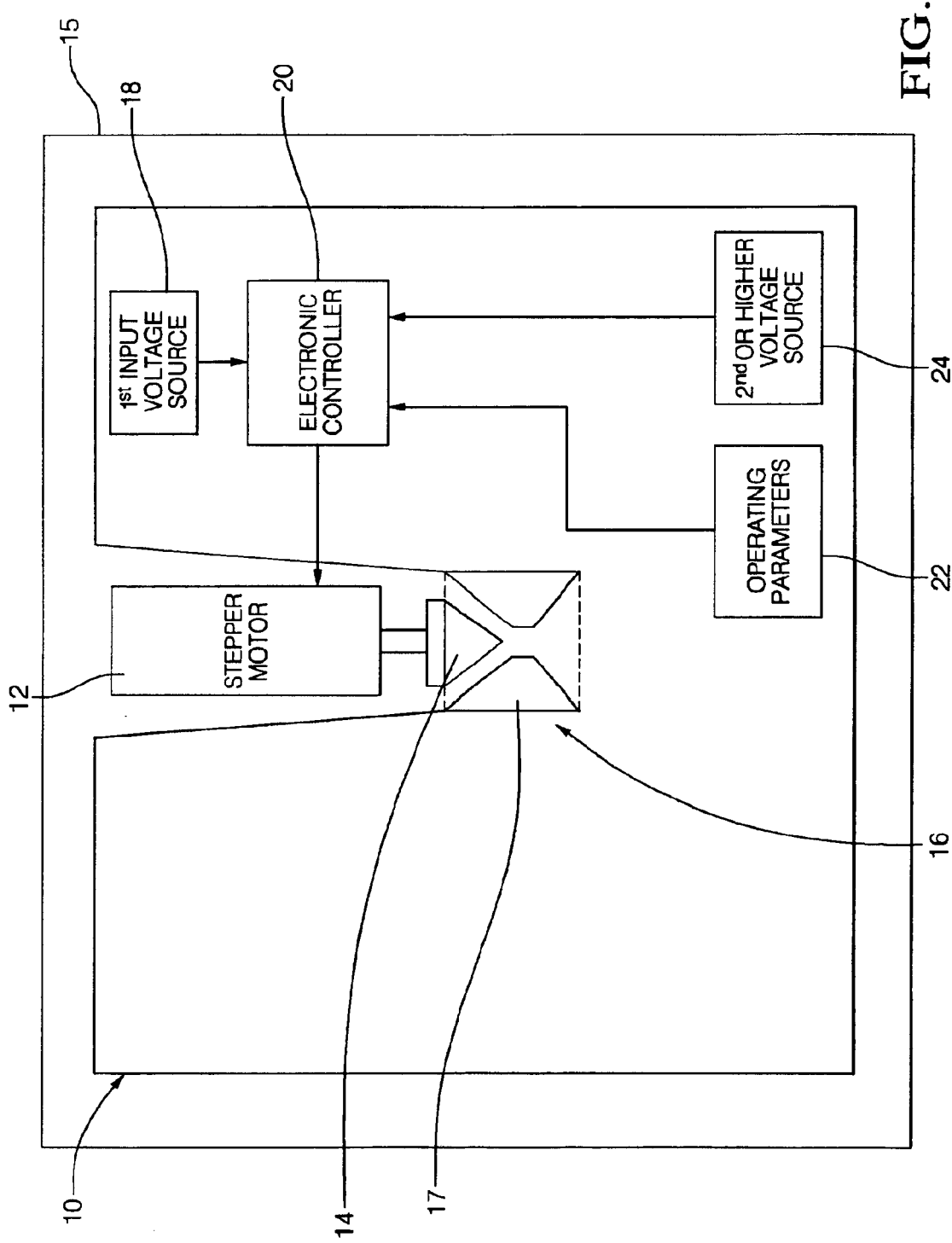
FIG. 1 is a schematic diagram of an apparatus in accordance with the invention.

Referring to FIG. 1, an apparatus 10, which may be a SOFC assembly or a proton exchange membrane (PEM) fuel cell assembly, includes a stepper motor 12 as an actuator of a valve pintle 14 in a valve sub-assembly 16 which may be an air inlet valve sub-assembly for the fuel cell assembly. Such fuel cell assemblies are known to be useful, for example, as auxiliary power units in a vehicle 15. As is known in the prior art, stepper motor 12 is configured and rated for a nominal torque output at a nominal input voltage from a first input voltage source 18. As is further known in the prior art, the armature of the stepper motor moves in discrete, predetermined steps in response to successive polarity reversals of voltage 18 as applied to the windings of motor 12.

In operation, a load is applied to motor 12 by pintle 14, requiring torque output from motor 12 to overcome the load and move the pintle. The load may vary with position of the pintle with respect to the valve body 17 and may increase substantially when manifold pressures in the SOFC assembly are high and/or when the valve in sub-assembly 16 is closed or nearly closed. At such times of high load, the torque required to move the pintle or to maintain the pintle in a desired position may exceed the nominal output torque of the motor. In accordance with the invention, when these and/or other relevant operating parameters 20 exceed predetermined limits which are known to exceed the output capabilities of the stepper motor, a programmable electronic controller 22 responsive to these parameters engages a second and higher voltage source 24 and provides the higher voltage to stepper motor 12, thus increasing the torque output of the motor to meet the immediate torque requirement. A convenient source of higher voltage may be the fuel cell itself which, in the case of a SOFC assembly, typically exhibits a minimum output of about 42 volts DC. Such output may be divided by conventional means to provide any desired input voltage between 12 and 42 volts to stepper motor 12.

Typically, such requirement may exist for only a very short time period, for example, for less than five seconds and typically for only a fraction of a second, after which the voltage is returned to nominal. Thus, over-heating of the motor windings is negligible. Further, in applications such as the air intake of an air control system of a fuel cell, motor 12 may be cooled by passage of air around it. Thus, in such an application, overheating of the stepper motor from applied overvoltage is not a serious threat to the integrity of the motor.

The invention will be seen to be useful in permitting incorporation of smaller stepper motors into many applications, resulting in reduced weight, size, and cost of the apparatus, and increased system efficiency and reliability.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a fuel cell assembly including an actuator for moving a pintle against a variable load, a method for increasing the torque output of the actuator to overcome a load exceeding the nominal torque output capability of the actuator, comprising the steps of:
    a) sensing when a high load condition exists; and
    b) increasing voltage provided to the actuator to increase the torque output thereof when said high load condition exists.

2. A method in accordance with claim 1 wherein said voltage increase is obtained from the electrical output of said fuel cell assembly.

3. A method in accordance with claim 1 wherein said fuel cell assembly is selected from the group consisting of solid-oxide fuel cell assembly and proton exchange membrane fuel cell assembly.

4. A method in accordance with claim 1 wherein a time period of said increased voltage is less than about five seconds.

5. In an apparatus including a stepper motor for actuating a moveable element, the stepper motor having a nominal torque output range at a nominal input voltage, the improvement for extending the torque output range of the motor comprising:
    a) means for determining an actuating load on said motor;
    b) means for providing a voltage input to said motor greater than said nominal input voltage;
    c) control means connected to said determining means and said providing means for responding when said actuating load exceeds a predetermined load value and to increase said voltage applied to said motor above said nominal voltage and thereby to increase the torque output of said motor to move said moveable element.

6. An apparatus in accordance with claim 5 wherein said apparatus is a fuel cell assembly including at least one pintle-type valve and said moveable element is a pintle thereof.

7. An apparatus in accordance with claim 6 wherein said fuel cell assembly is selected from the group consisting of solid-oxide fuel cell assembly and proton exchange membrane fuel cell assembly.

8. An apparatus in accordance with claim 6 wherein said valve is an air valve in said fuel cell assembly and wherein said stepper motor is an actuator for said air valve.

9. An apparatus in accordance with claim 6 wherein said fuel cell assembly is included in an auxiliary power unit for a vehicle.

10. In an apparatus including a stepper motor for actuating a moveable element, the stepper motor having a nominal torque output range at a nominal input voltage, the improvement for extending the torque output range of the motor comprising:
    a) an operating parameter that determines an actuating load on said motor;
    b) a higher voltage source that provides a voltage input to said motor greater than said nominal input voltage; and
    c) an electronic controller connected to said operating parameter and said higher voltage source for responding when said actuating load exceeds a predetermined load value and to increase said voltage applied to said motor above said nominal voltage and thereby to increase the torque output of said motor to move said moveable element.

11. An apparatus in accordance with claim 10 wherein said apparatus is a fuel cell assembly including at least one pintle-type valve and said moveable element is a pintle thereof.

12. An apparatus in accordance with claim 11 wherein said fuel cell assembly is selected from the group consisting of solid-oxide fuel cell assembly and proton exchange membrane fuel cell assembly.

13. An apparatus in accordance with claim 11 wherein said valve is an air valve in said fuel cell assembly and wherein said stepper motor is an actuator for said air valve.

14. An apparatus in accordance with claim 11 wherein said fuel cell assembly is included in an auxiliary power unit for a vehicle.

15. An apparatus in accordance with claim 11 wherein said higher voltage source is said fuel cell.

* * * * *